No. 895,763. PATENTED AUG. 11, 1908.
G. P. JONES & W. A. RINDRESS.
SPIKE PULLER.
APPLICATION FILED OCT. 8, 1907.

WITNESSES
Wm. A. Wyman
Russell T. Smart

INVENTORS-
G. P. JONES.
W. A. RINDRESS
BY Fred B. Fetherstonhaugh
ATT'Y.

UNITED STATES PATENT OFFICE.

GEORGE PUTMAN JONES AND WILLIAM ANDREW RINDRESS, OF MONCTON, NEW BRUNSWICK, CANADA.

SPIKE-PULLER.

No. 895,763.      Specification of Letters Patent.      Patented Aug. 11, 1908.

Application filed October 8, 1907. Serial No. 396,479.

*To all whom it may concern:*

Be it known that we, GEORGE PUTMAN JONES, gentleman, and WILLIAM ANDREW RINDRESS, inspector, both of the city of Moncton, in the county of Westmoreland, Province of New Brunswick, Canada, have invented certain new and useful Improvements in Spike-Pullers, of which the following is a specification.

Our invention relates to improvements in spike pullers, and the objects of our invention are to provide an exceedingly simple and efficient form of device for pulling spikes from railroad ties and such as will grip the spikes with absolute certainty and may be readily adjusted to position thereover; and it consists essentially of the improved construction hereinafter described in detail in the accompanying specifications and drawings and specifically set forth in the claims.

Figure 2:
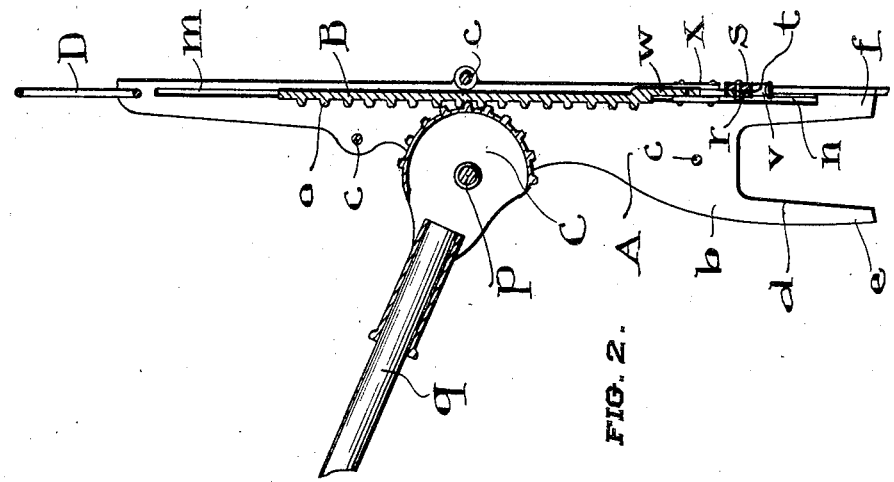
Figure 1:
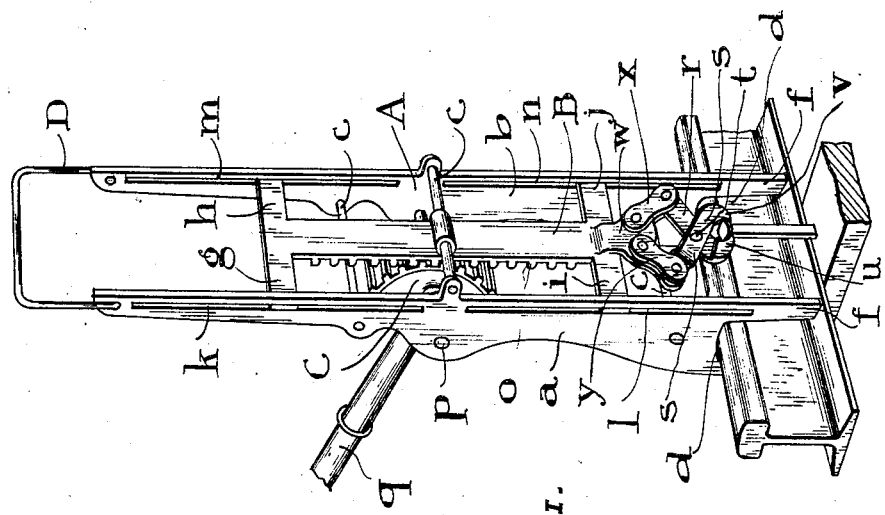

In the drawings, Figure 1 is a perspective view of our improved spike puller. Fig. 2 is a vertical section of the same.

In the drawings like letters of reference indicate corresponding parts in both figures.

Referring to the drawings, A represents the frame which comprises two parallel and vertically extending members $a$ and $b$, connected by horizontal rods $c$. The bottom of each of the side members $a$ and $b$ has an open slot $d$ cut therein into which the head of the rail is adapted to fit, whereby two legs $e$ and $f$ are provided which rest on the base of the rail.

B represents a vertically reciprocating claw bar having projections $g$, $h$, $i$ and $j$ thereon which enter into vertically extending slots $k$, $l$, $m$ and $n$ provided in the side members $a$ and $b$. The claw bar is reciprocated by suitable means, that shown comprising a rack $o$ formed on the rear side thereof which engages a partially formed pinion wheel C which is rotatably supported on a shaft $p$ journaled in the side members and has an operating handle $q$ connected thereto, whereby it may be oscillated.

$r$ and $s$ represent the gripping jaws which are centrally pivoted at $t$ and have their lower extremities formed with co-acting claws $u$ and $v$. Their upper extremities are connected with a projection $w$ on the claw bar by means of suitable links $x$ and $y$. For convenience in lifting the spike puller, a bail D is pivotally connected to the upper end thereof, the bail illustrated being U-shaped in form and having inturned ends extending into holes in the side members of the frame.

In operation, the spike puller is adjusted in position with regard to the spike and the claw-bar lowered until the claws on the gripping jaws are on opposite sides of the spike. The claw bar is then raised through the operation of the handle $q$ which closes the gripping jaws and causes the claws thereon to get a firm hold of the spike, which is thereby raised.

While the device has been described herein with great particularity of detail, yet it will be readily understood that in carrying out the construction of the same, changes within the scope of the appended claims might be made without departing from the spirit of the invention.

What we claim as our invention is:—

A spike-puller, comprising a frame composed of two, similar, thin side-plates, each said plate tapering towards its top and having one edge formed with a waving contour, each said plate being cut away at its bottom to straddle a railroad-rail, and each said plate having vertically-extending slots near the edge thereof opposite the edge with the waving contour, and rods connecting the said plates; a vertical claw-carrying rack bar disposed between the two plates and of greatly less width than that of the space between the two plates, said rack-bar having, on one face thereof, a rack and, at its ends, horizontal cross-pieces engaging said vertical slots; a pinion for engaging the rack and operatively mounted on one of said connecting rods; and a handle for actuating the pinion.

Signed at Moncton, Province of New Brunswick, this first day of October, 1907.

GEORGE PUTMAN JONES.
                 WILLIAM ANDREW RINDRESS.

Witnesses:
     E. ALB. REILLY,
     MELBOURNE F. KEITH.